United States Patent
Ikemori et al.

(10) Patent No.: US 8,582,744 B2
(45) Date of Patent: Nov. 12, 2013

(54) METHOD AND APPARATUS FOR IDENTIFIER CHANGE NOTIFICATION

(75) Inventors: Takashi Ikemori, Kawasaki (JP); Yasushi Yamane, Osaka (JP); Yukiko Okawa, Osaka (JP); Katuyuki Miyazaki, Osaka (JP)

(73) Assignee: Fujitsu Limited, Kawasaki (JP)

( * ) Notice: Subject to any disclaimer, the term of this patent is extended or adjusted under 35 U.S.C. 154(b) by 1158 days.

(21) Appl. No.: 12/222,378

(22) Filed: Aug. 7, 2008

(65) Prior Publication Data

US 2008/0304647 A1    Dec. 11, 2008

Related U.S. Application Data

(63) Continuation of application No. PCT/JP2008/303714, filed on Feb. 28, 2006.

(51) Int. Cl.
 *H04M 3/42* (2006.01)
(52) U.S. Cl.
 USPC .................. 379/207.02; 379/213.01
(58) Field of Classification Search
 USPC .............. 379/213.01, 210.02, 201.01, 207.02
 See application file for complete search history.

(56) References Cited

U.S. PATENT DOCUMENTS

| | | | | |
|---|---|---|---|---|
| 7,818,295 | B2 * | 10/2010 | Mihaylo et al. | 707/618 |
| 7,894,588 | B2 * | 2/2011 | Smith et al. | 379/210.02 |
| 2002/0169838 | A1 | 11/2002 | Oyama | |
| 2003/0149776 | A1 | 8/2003 | Tsunezumi | |
| 2004/0044738 | A1 * | 3/2004 | Ohno et al. | 709/206 |
| 2004/0071281 | A1 * | 4/2004 | Rashid | 379/210.02 |
| 2005/0254636 | A1 | 11/2005 | Niwa | |

FOREIGN PATENT DOCUMENTS

| | | |
|---|---|---|
| JP | 63-67077 | 3/1988 |
| JP | 2001-111601 | 4/2001 |
| JP | 2002-142027 | 5/2002 |
| JP | 2002-183043 | 6/2002 |
| JP | 2003-229957 | 8/2003 |
| JP | 2004-110687 | 4/2004 |
| JP | 2004-173129 | 6/2004 |
| JP | 2005-328313 | 11/2005 |

OTHER PUBLICATIONS

Japanese Office Action issued Jan. 4, 2011 in corresponding Japanese Patent Application 2008-502578.
International Search Report mailed Apr. 11, 2006 in connection with the International application No. PCT/JP2006/303714.

* cited by examiner

*Primary Examiner* — Duc Nguyen
*Assistant Examiner* — Sonia Gay
(74) *Attorney, Agent, or Firm* — Staas & Halsey LLP

(57) ABSTRACT

When receiving an incoming call to the previous phone number, adequacy of notification is determined on the basis of history data relating to a caller number and a previous phone number. The method includes: acquiring a caller number and a destination number upon receipt of a request for connecting to a specific destination number, acquiring history data relating to the destination number and caller number from history data storage, analyzing the acquired history data in accordance with preset notification adequacy determination rules to determine whether to provide notification of the new phone number, and transmitting notification data.

20 Claims, 13 Drawing Sheets

FIG. 2

| CUSTOMER ID ~202 | PREVIOUS PHONE NUMBER ~204 | NEW PHONE NUMBER ~206 | NOTIFICATION ADEQUACY DETERMINATION RULES ~208 | NOTIFICATION START DATE ~210 | NOTIFICATION END DATE ~212 |
|---|---|---|---|---|---|

FIG. 3

| RULE ID ~252 | NOTIFICATION ADEQUACY ~254 | TARGET PERIOD ~256 | INCOMING CALL COUNT ~258 | OUTGOING CALL COUNT ~260 | CONVERSATION COUNT ~262 |
|---|---|---|---|---|---|
| RULE_11 | INADEQUATE | 30 DAYS | ☐ THAN ☐ TIMES | ☐ THAN ☐ TIMES | ☐ THAN ☐ TIMES |
| RULE_12 | INADEQUATE | 10 DAYS | LESS THAN 1 TIMES | LESS THAN 1 TIMES | LESS THAN 1 TIMES |
| RULE_13 | INADEQUATE | ☐ DAYS | MORE THAN 10 TIMES | LESS THAN 1 TIMES | ☐ THAN ☐ TIMES |

FIG. 4

| CUSTOMER PHONE NUMBER ~214 | COUNTERPART PHONE NUMBER ~216 | INCOMING DATE & TIME ~218 | OUTGOING DATE & TIME ~220 | CONVERSATION TIME ~222 |
|---|---|---|---|---|

FIG. 10

| 402 | 404 | 406 | 408 | 410 | 412 |
|---|---|---|---|---|---|
| CUSTOMER ID | PREVIOUS PHONE MAIL ADDRESS | NEW PHONE MAIL ADDRESS | NOTIFICATION ADEQUACY DETERMINATION RULES | NOTIFICATION START DATE | NOTIFICATION END DATE |

FIG. 11

| 452 | 454 | 456 | 458 | 460 | 462 |
|---|---|---|---|---|---|
| RULE ID | NOTIFICATION ADEQUACY | TARGET PERIOD | INCOMING PHONE MAIL COUNT | OUTGOING PHONE MAIL COUNT | AVERAGE RECEIVED DATA AMOUNT |
| RULE_21 | INADEQUATE | 30 DAYS | THAN TIMES | LESS THAN 1 TIMES | THAN kB |
| RULE_22 | INADEQUATE | 10 DAYS | LESS THAN 1 TIMES | THAN TIMES | THAN kB |
| RULE_23 | INADEQUATE | DAYS | MORE THAN 10 TIMES | THAN TIMES | MORE THAN 1000 kB |

FIG. 12

| 414 | 416 | 418 | 420 | 422 | 424 |
|---|---|---|---|---|---|
| CUSTOMER PHONE MAIL ADDRESS | COUNTERPART PHONE MAIL ADDRESS | INCOMING DATE & TIME | OUTGOING DATE & TIME | RECEIVED DATA AMOUNT | SENT DATA AMOUNT |

# METHOD AND APPARATUS FOR IDENTIFIER CHANGE NOTIFICATION

CROSS REFERENCE TO RELATED APPLICATIONS

This is a continuing application, filed under 35 U.S.C. §111(a), of International Application PCT/JP2006/303714, filed Feb. 28, 2006, the contents of which are incorporated herein by reference.

BACKGROUND

1. Field

The present invention relates to a communication service. In particular, the present invention relates to a method for providing notification of a change of a phone number or a phone mail address.

2. Description of the Related Art

The notification of a change of a phone number is required to be provided to acquaintances of a cell phone user when the user changes his or her cell phone number. Instead of users notifying their acquaintances of new phone numbers, phone number change notification services have been provided by telephone service companies since the age of fixed telephones, where phone number change notification systems provide new phone numbers to all incoming calls to previous phone numbers. Also, such measures are considered that a phone number change notification system does not provide a new phone number to incoming calls from specific caller numbers or that a phone number change notification system provides a new phone number to incoming calls from specific caller numbers. These are efforts to limit targets to be notified of a phone number as personal information for the purposes of privacy protection, antistalking, prank call prevention, and the like.

Japanese Laid-open Patent Publication No. 2005-328313 discusses a technology for causing a phone number change notification system to provide a new phone number to incoming calls from specific caller numbers.

In order for the system of the cell phone service company to provide the new phone number to incoming calls from the specific caller numbers, the phone number changer (the person who changes his or her phone number) is required to previously register the phone numbers of targets to be notified of the new phone number. For this reason, the phone number changer uses the address book function of his or her cell phone, that is, the phone number changer selects the phone numbers of targets to be notified of the new phone number from among phone numbers included in the address book, and then registers the selected phone numbers in the system of the cell phone service company.

However, if a lot of phone numbers are included in the address book, it is troublesome work for the phone number changer to determine, for each of the phone numbers, adequacy of notification of the new phone number so as to register adequate phone numbers. Also, if the phone number changer repurchases a cell phone due to the loss of his or her cell phone and thus changes the previous phone number, the phone number changer cannot use the address book function of the previous cell phone since he or she no longer has the previous cell phone at hand. Therefore, it is difficult for the phone number changer to specify the phone numbers of targets to be notified of his or her new phone number. This also applies to cases where a phone mail address is changed.

SUMMARY

An object of the present invention is to provide an identifier change notification method by which when providing notification of the change of a communication identifier such as a phone number or a phone mail address, an identifier change notification apparatus notifies appropriate targets of a new identifier without the identifier changer (the person who changes his or her identifier for communication) previously specifying the communication identifiers of targets to be notified of the new identifier.

According to an aspect of the present invention, provided is an identifier change notification method for notifying a communication device of a change of a communication identifier. An information processing apparatus includes a data storage storing a previous identifier, a new identifier, and history data. The method includes: acquiring a source identifier and a destination identifier from incoming data, acquiring history data relating to both the previous identifier and the source identifier if the destination identifier matches the previous identifier, determining adequacy of notifying the communication device of the new identifier, and transmitting the new identifier to the communication device.

The communication identifier may be a phone number or a phone mail address.

The method may further include: acquiring the previous identifier if the destination identifier matches the new identifier, acquiring history data relating to both the previous identifier and the source identifier if the destination identifier matches the new identifier, and refusing transfer of the incoming data if the determined adequacy indicates that notification is inadequate.

The method may further include: acquiring the previous identifier if the destination identifier matches the new identifier, refusing transfer of the incoming data if the data storage has refusal data indicating that notification is inadequate with respect to the source identifier, and storing the refusal data in the data storage if the determined adequacy indicates that notification is inadequate.

BRIEF DESCRIPTION OF THE DRAWINGS

FIG. 2 is a diagram illustrating an example configuration of number notification data according to a first embodiment of the present invention;

FIG. 3 is a diagram illustrating examples of notification adequacy determination rules according to a first embodiment of the present invention;

FIG. 4 is a diagram illustrating an example configuration of history data according to a first embodiment of the present invention;

FIG. 10 is a diagram illustrating an example configuration of address notification data according to a second embodiment of the present invention;

FIG. 11 is a diagram illustrating examples of notification adequacy determination rules according to a second embodiment of the present invention;

FIG. 12 is a diagram illustrating an example configuration of history data according to a second embodiment of the present invention;

DESCRIPTION OF THE PREFERRED EMBODIMENTS

According to aspects of the present invention, an identifier change notification apparatus determines whether to provide notification of a new identifier of a destination (that is, the identifier changer) to a source, on the basis of history data of communications relating to the communication identifier of the source and the previous identifier of the destination.

The previous identifier of the identifier changer is registered as a target of the identifier change notification process, and history data regarding the previous identifier is recorded. Also, notification data including the new identifier is registered in association with the previous identifier.

When an acquaintance of the identifier changer makes a transmission to the previous identifier of the identifier changer, the identifier change notification apparatus receives the transmission. The identifier change notification apparatus acquires the communication identifier of the acquaintance as the source identifier and the previous identifier of the identifier changer as the destination identifier. The identifier change notification apparatus also acquires history data including the source identifier as the counterpart identifier from history data regarding the destination identifier. Then, the identifier change notification apparatus determines whether to provide identifier change notification according to rules previously set.

The identifier change notification apparatus determines whether to provide identifier change notification on the basis of the history data. Thus, the identifier change notification apparatus may notify appropriate targets of the new identifier even if the identifier changer does not previously specify the communication identifiers of the targets to which notification of the new identifier is to be provided.

[First Embodiment]

Figure 1:
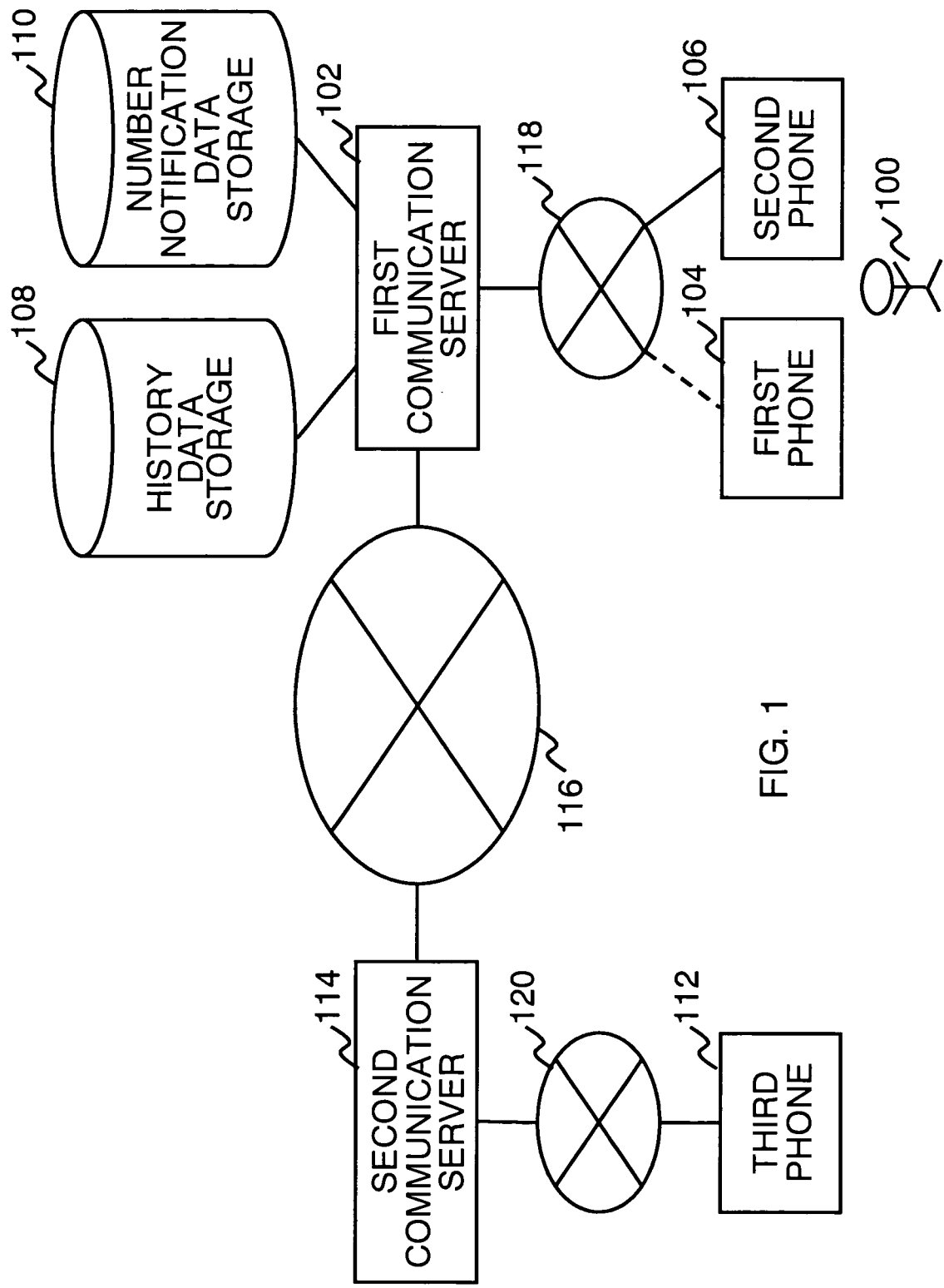
FIG. 1 is a diagram illustrating relations between phones and communication servers in a description of an identifier change notification method according to a first embodiment of the present invention.

Referring now to FIGS. 1 to 8, an identifier change notification method according to a first embodiment of the present invention will be described. The first embodiment of the present invention allows notification of the change of a phone number. FIG. 1 is a diagram illustrating relations between phones and communication servers in a description of an identifier change notification method according to a first embodiment of the present invention.

A phone number changer 100 loses a first phone 104 controlled by a first communication server 102 and then uses a second phone 106 controlled by the same server. Accordingly, the phone number changer 100 is required to provide notification of a new phone number for identifying the second phone 106, to acquaintances who know only the previous phone number for identifying the first phone 104. The first communication server 102 stores history data relating to phones under its control in history data storage 108. The phone number changer 100 sets rules for determining whether to provide notification of the new phone number on the basis of the history data stored in the history data storage 108. These rules are contained in number notification data stored in number notification data storage 110 of the first communication server 102. The phones and communication servers shown in FIG. 1 may communicate with one another over communication networks 116, 118, and 120.

FIG. 2 is a diagram illustrating an example configuration of number notification data according to a first embodiment of the present invention. A customer ID (identifier) 202 is data for uniquely identifying the phone number changer 100. A previous phone number 204 is a phone number of the phone number changer 100 before a phone number change is made, and serves as a destination number when receiving incoming calls from acquaintances of the phone number changer 100. A new phone number 206 is a phone number of the phone number changer 100 after the phone number change is made and serves as a main part of number notification data when a phone number change notification is provided. Notification adequacy determination rules 208 will be described later. A notification start date 210 is the start date of a phone number change notification service. A notification end date 212 is the end date of the phone number change notification service. The configuration of the number notification data stored in the number notification data storage 110 is not limited to the configuration shown in FIG. 2 and may be any configuration as long as the number notification data stored in the number notification data storage 110 includes the previous phone number 204, new phone number 206, and notification adequacy determination rules 208.

FIG. 3 is a diagram illustrating examples of notification adequacy determination rules according to a first embodiment of the present invention. Each rule record contains a rule ID 252 identifiable of the rule, a notification adequacy 254 indicating a determination result, and conditions for determination. In this example, adequacy of notification is determined on the basis of an incoming call count 258, an outgoing call count 260, or a conversation count 262 during a target period 256 contained in the history data stored in the history data storage 108. Any blank item in FIG. 3 indicates that no condition is set for the blank item. A rule_11 indicates that the new phone number 206 will not be provided to a target to which no call has been made during the last 30 days according to the history data stored in the history data storage 108. A rule_12 indicates that the new phone number 206 will not be provided to a target from which no incoming call has been received and with which no phone conversation has been held during the last 10 days according to the history data stored in the history data storage 108. A rule_13 indicates that the new phone number 206 will not be provided to a target from which more than ten incoming calls have been received and to which no call has been made through the entire period of time according to the history data stored in the history data storage 108. The phone number changer 100 defines rules in such manners. Accordingly, notification of the new phone number 206 is provided to targets that do not satisfy the conditions set under these rules. The rules shown in FIG. 3 are applicable as long as the history data stored in the history data storage 108 includes, for example, data on the date & time of incoming calls, date & time of outgoing calls, and whether a phone conversation has been held. The notification adequacy determination rules 208 are not limited to what are shown in FIG. 3 and any arbitrary rule may be set on the basis of data on the count or frequency of incoming/outgoing calls, a phone conversation time, an hour of day of incoming/outgoing calls, a time period between the time when a call reception request has arrived and the time when the request is cancelled, an operation for refusing call reception, or the like obtained from the history data stored in the history data storage 108. In addition to rules based on the history data stored in the history data storage 108, rules based on data on the current incoming call may be set. Such rules may include a rule based on the time of the all reception, the absence of notification of a caller number, a call from a public phone, a caller number registered to an incoming call refusal list, or the like.

FIG. 4 is a diagram illustrating an example configuration of history data according to a first embodiment of the present invention. A customer phone number 214 is a phone number controlled by the first communication server 102. For the sake of convenience, it is assumed that the history data storage 108 stores history data relating to the previous phone number of only a customer requesting the phone number change notification service. A counterpart phone number 216 is a phone number of a counterpart which the customer identified with the customer phone number 214 has had incoming/outgoing calls with. An incoming date & time 218 is data indicating the date and time of when the incoming call has been received. An outgoing date & time 220 is data indicating the date and time of when the outgoing call has been made. A conversation time 222 is data indicating the length of a time during which a phone conversation has been held. The configuration of the history data stored in the history data storage 108 is not limited to the configuration shown in FIG. 4 and may be any configuration as long as the history data includes the customer phone number 214 and counterpart phone number 216. The notification adequacy determination rules 208 are configured on the basis of data included in the history data stored in the history data storage 108.

Figure 5:
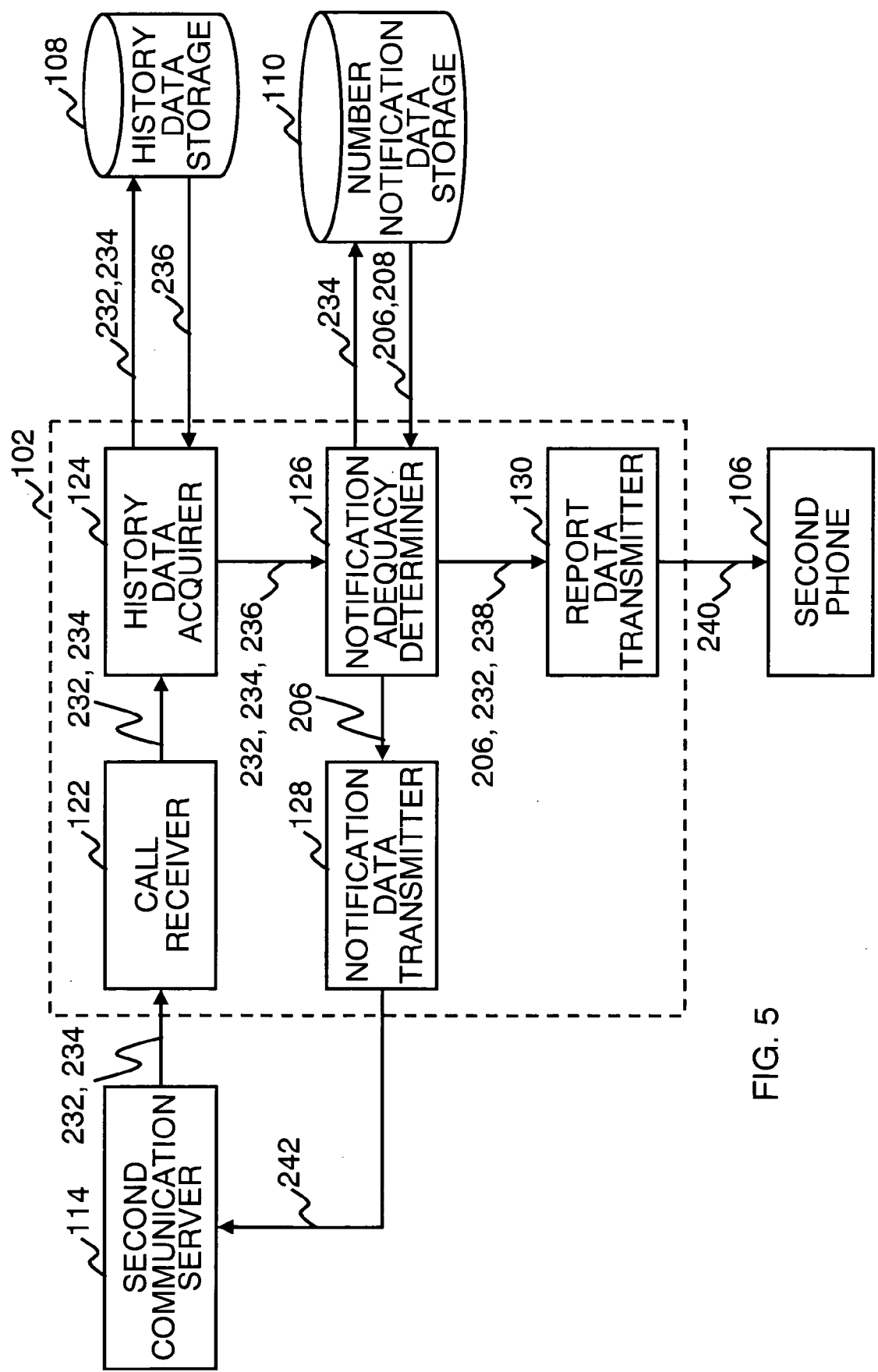
FIG. 5 is a block diagram illustrating an outline configuration of a first communication server executing an identifier change notification method according to a first embodiment of the present invention.
Figure 6:
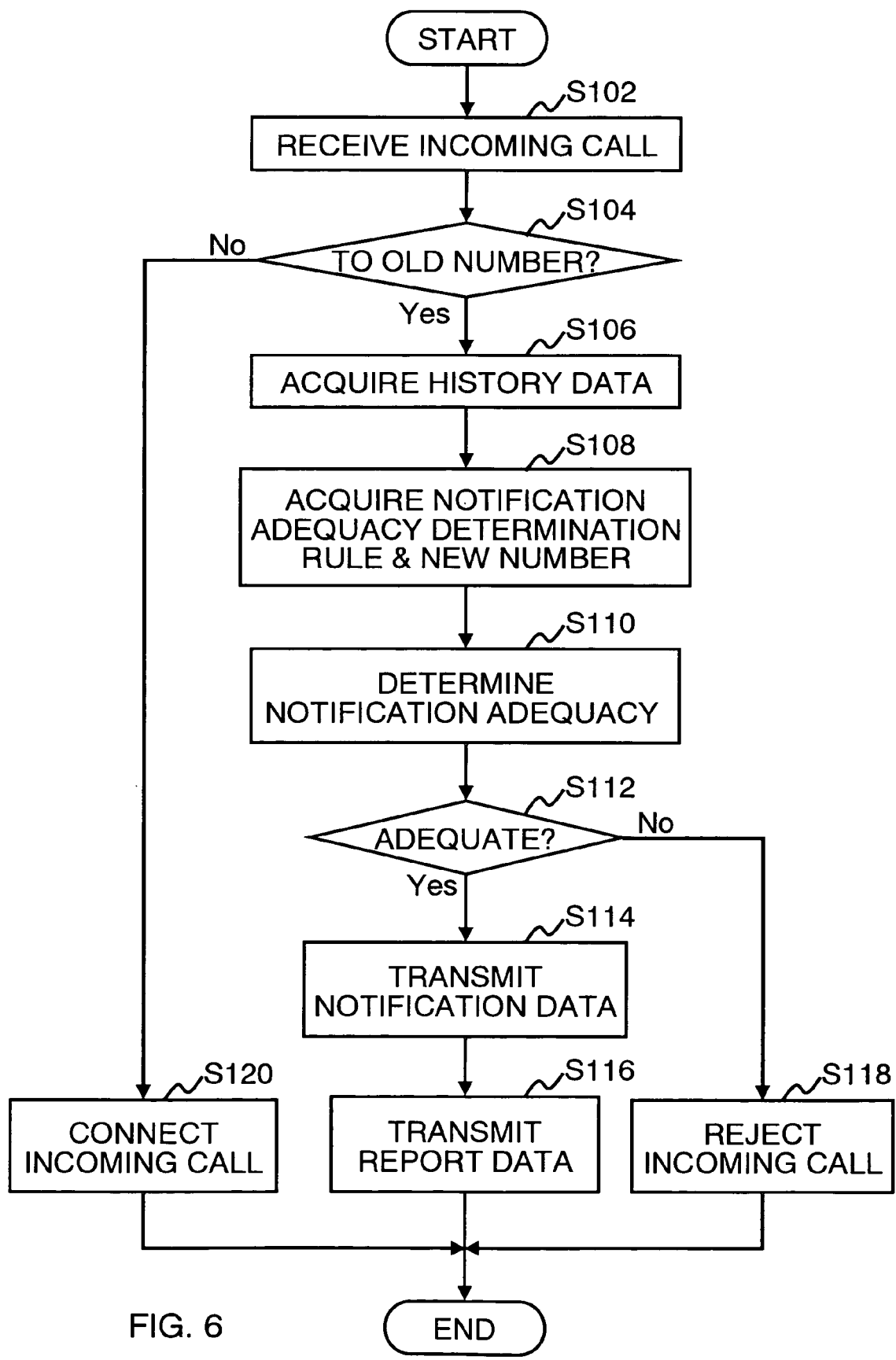
FIG. 6 is a flowchart illustrating a processing flow of a first communication server executing an identifier change notification method according to a first embodiment of the present invention.

FIG. 5 is a block diagram illustrating an outline configuration of a first communication server executing an identifier change notification method according to a first embodiment of the present invention. FIG. 6 is a flowchart illustrating a processing flow of a first communication server executing an identifier change notification method according to a first embodiment of the present invention.

When an acquaintance of the phone number changer 100 makes a call to the previous phone number 204 of the phone number changer 100 from a third phone 112, the call is received by the first communication server 102 via a second communication server 114.

A call receiver 122 acquires the caller number 232 and destination number 234 (operation S102) and outputs the acquired numbers to a history data acquirer 124.

The history data acquirer 124 search the history data storage 108 for history data 236 including the destination number 234 as the customer phone number 214 and the caller number 232 as the counterpart phone number 216 (operation S106) and then outputs the acquired history data 236 as well as the caller number 232 and destination number 234 to a notification adequacy determiner 126. If there is no history data including the destination number 234 as the customer phone number 214 (No in operation S104), a normal inbound connection process is performed (operation S120). This process will not be described.

The notification adequacy determiner 126 searches the number notification data storage 110 for number notification data including the destination number 234 as the previous phone number 204 to acquire the notification adequacy determination rules 208 and the new phone number 206 (operation S108). The notification adequacy determiner 126 analyses the history data 236 in accordance with the notification adequacy determination rules 208 so as to determine adequacy of notification of the phone number change (operation S110). Then the notification adequacy determiner 126 outputs a determination result 238 as well as the caller number 232 and new phone number 206 to a report data transmitter 130. If the determination result 238 indicates that notification is adequate (Yes in operation S112), the notification adequacy determiner 126 outputs the new phone number 206 to a notification data transmitter 128. If the determination result 238 indicates that notification is inadequate (No in operation S112), a normal connection refusal process (operation S118) is performed. The normal connection refusal process is the same process usually performed when the destination number 234 is invalid, thus the process will not be described.

The notification data transmitter 128 incorporates the new phone number 206 into a previously prepared audio notification message and then transmits the resultant message 242 as a response to the above-described call (operation S114). Instead of transmitting the audio notification message, the first communication server 102 may connect the above-described call to the second phone 106 which is identified with the new phone number 206.

The report data transmitter 130 selects an audio report message in accordance with the determination result 238 from among audio report messages previously prepared for each determination result, incorporates the caller number 232 into the selected audio report message, and transmits the resultant message 240 to the second phone 106 which is identified with the new phone number 206. Or the report data transmitter 130 may register the resultant message 240 as an audio mail addressed to the new phone number 206. The processing result of the notification data transmission may be notified to the report data transmitter 130 by the notification data transmitter 128, and an audio report message or mail reflecting the processing result may be transmitted or registered.

Figure 7:
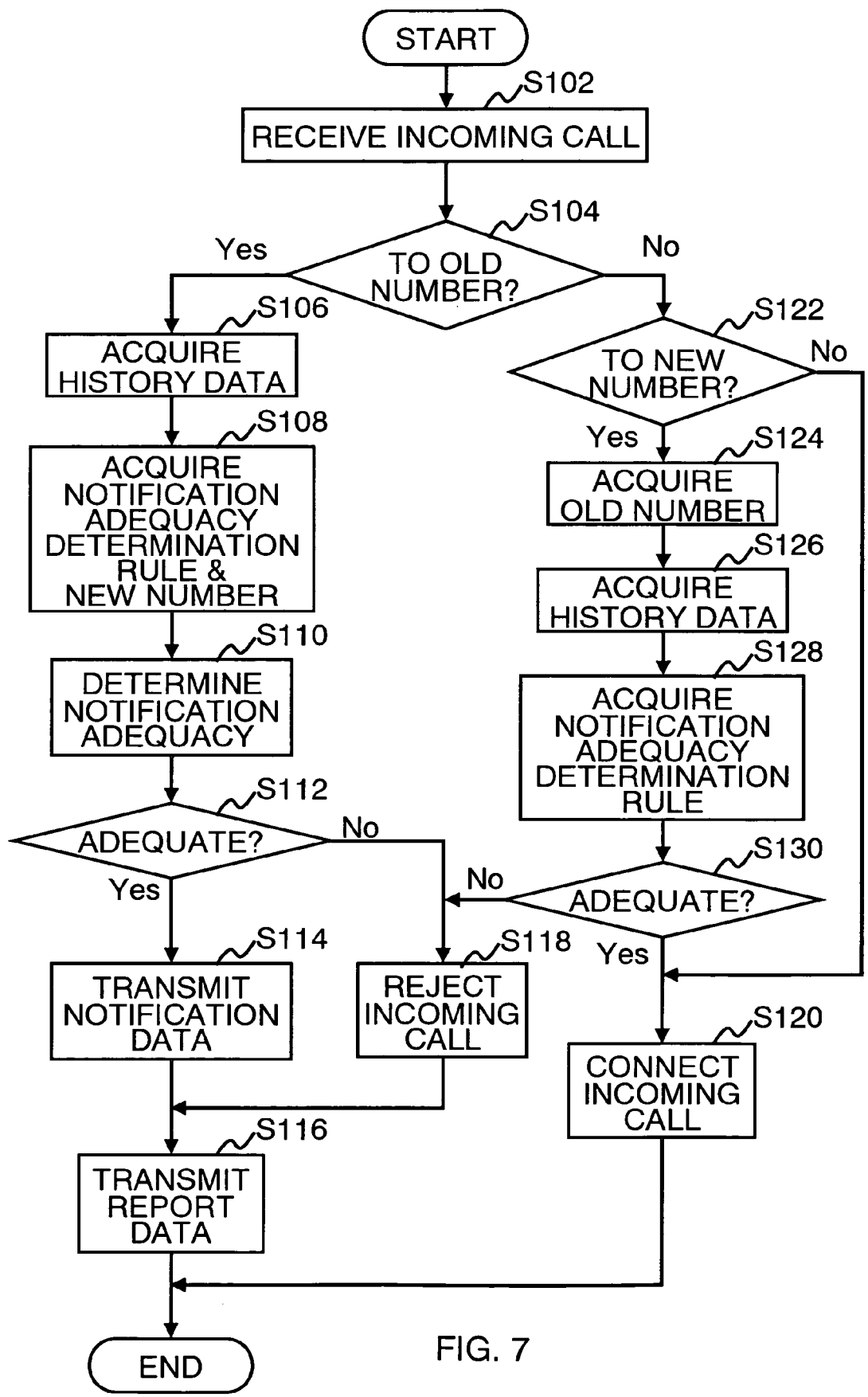
FIG. 7 is a flowchart illustrating a processing flow of a first communication server according to a first embodiment of the present invention when receiving an incoming call to a new phone number.

An incoming call to the new phone number 206 may be refused to connect if the caller number 232 is determined, by the notification adequacy determiner 126, to be inadequate to be notified of the phone number change. FIG. 7 is a flowchart illustrating a processing flow of a first communication server according to a first embodiment of the present invention when receiving an incoming call to a new phone number. If the history data storage 108 stores no history data including the destination number 234 as the customer phone number 214 (No in operation S104), the history data acquirer 124 searches the number notification data storage 110 for number notification data including the destination number 234 as the new phone number 206 to acquire the previous phone number 204 (operation S124). The history data acquirer 124 searches the history data storage 108 for the history data 236 including the previous phone number 204 as the customer phone number 214 and the caller number 232 as the counterpart phone number 216 (operation S126) and then outputs the acquired history data 236 as well as the caller number 232 and destination number 234 to the notification adequacy determiner 126.

The notification adequacy determiner 126 searches the number notification data storage 110 for number notification data including the destination number 234 as the new phone number 206 to acquire the notification adequacy determination rules 208 (operation S128). The notification adequacy determiner 126 analyses the history data 236 in accordance with the notification adequacy determination rules 208 to determine adequacy of the connection. If the notification adequacy determiner 126 determines that notification is adequate, in accordance with the notification adequacy determination rules 208, the connection may be adequate. If it is determined that notification is inadequate, the connection may be inadequate. If the connection is adequate (Yes in operation S130), a normal inbound connection process is performed (operation S120). If the connection is inadequate (No in operation S130), a normal connection refusal process is performed (operation S118) and the notification adequacy determiner 126 outputs the determination result 238 as well as the caller number 232 and destination number 234 to the report data transmitter 130. The report data transmitter 130 incorporates the caller number 232 into a previously prepared audio report message and then transmits the resultant message 240 to the second phone 106 which is identified with the destination number 234 (operation S116). Or the report data transmitter 130 may register the resultant message 240 as an audio mail addressed to the destination number 234.

Figure 8:
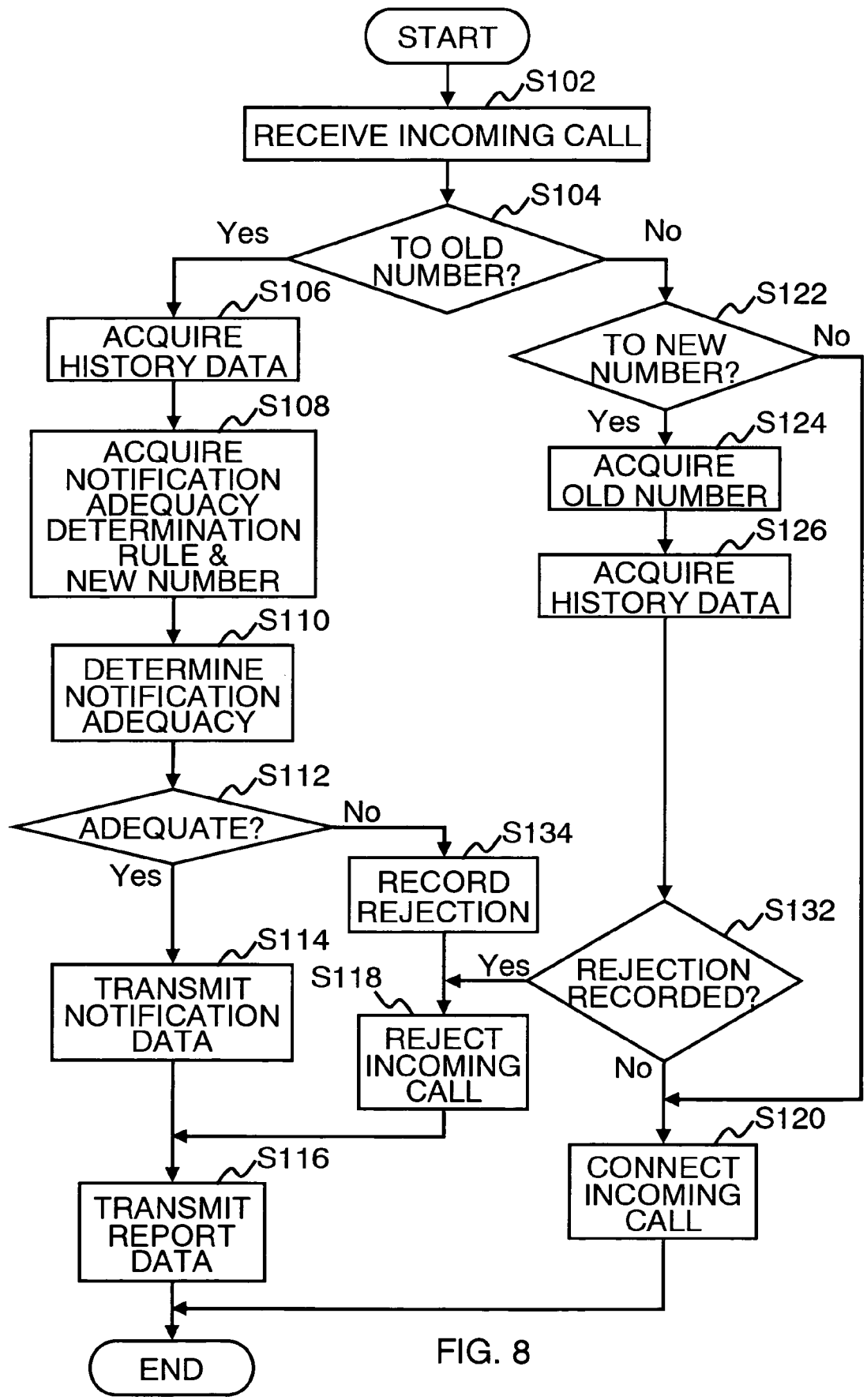
FIG. 8 is a flowchart illustrating a processing flow of a first communication server according to a first embodiment of the present invention when receiving an incoming call to a new phone number.

An incoming call to the new phone number 206 may be refused to connect if a call has been made from the caller number 232 to the previous phone number 204 and no phone number change notification has been provided thereto. FIG. 8 is a flowchart illustrating a processing flow of a first communication server according to a first embodiment of the present invention when receiving an incoming call to a new phone number. If it is determined that notification is inadequate for an incoming call to the previous phone number 204 (No in operation S112), the history data acquirer 124 adds data indicating that notification is inadequate, to the history data 236 including the destination number 234 as the customer phone number 214 and the caller number 232 as the counterpart phone number 216 (operation S134). If the incoming call is not destined for the previous phone number 204, that is, if the history data storage 108 stores no history data including the destination number 234 as the customer phone number 214 (No in operation S104), the history data acquirer 124 searches the number notification data storage 110 for number notification data including the destination number 234 as the new phone number 206 to acquire the previous phone number 204 (operation S124). The history data acquirer 124 searches the history data storage 108 for the history data 236 including the previous phone number 204 as the customer phone number 214 and the caller number 232 as the counterpart phone number 216 (operation S126). If the acquired history data 236 contains data indicating that notification is inadequate (Yes in operation S132), a normal connection refusal process is performed (S118), and the history data acquirer 124 outputs the caller number 232 and destination number 234 to the report data transmitter 130. The report data transmitter 130 incorporates the caller number 232 into a previously prepared audio report message and then transmits the resultant message 240 to the second phone 106 which is identified with the destination number 234 (operation S116). Or the report data transmitter 130 may register the resultant message 240 as an audio message addressed to the destination number 234.

Although the phone number change notification is provided by the first communication server 102 in the above description, it may be provided by the second phone 106 instead. Such an arrangement is, for example, storing history data related to the previous phone number in a storage of the second phone 106 instead of the history data storage 108, transferring an incoming call destined for the previous phone number to the second phone 106 from the first communication server 102, and notifying the second phone 106 that the incoming call is destined for the previous phone number. In this arrangement, transmission of the report message 240 (operation S116) may not be required.

[Second Embodiment]

Figure 9:
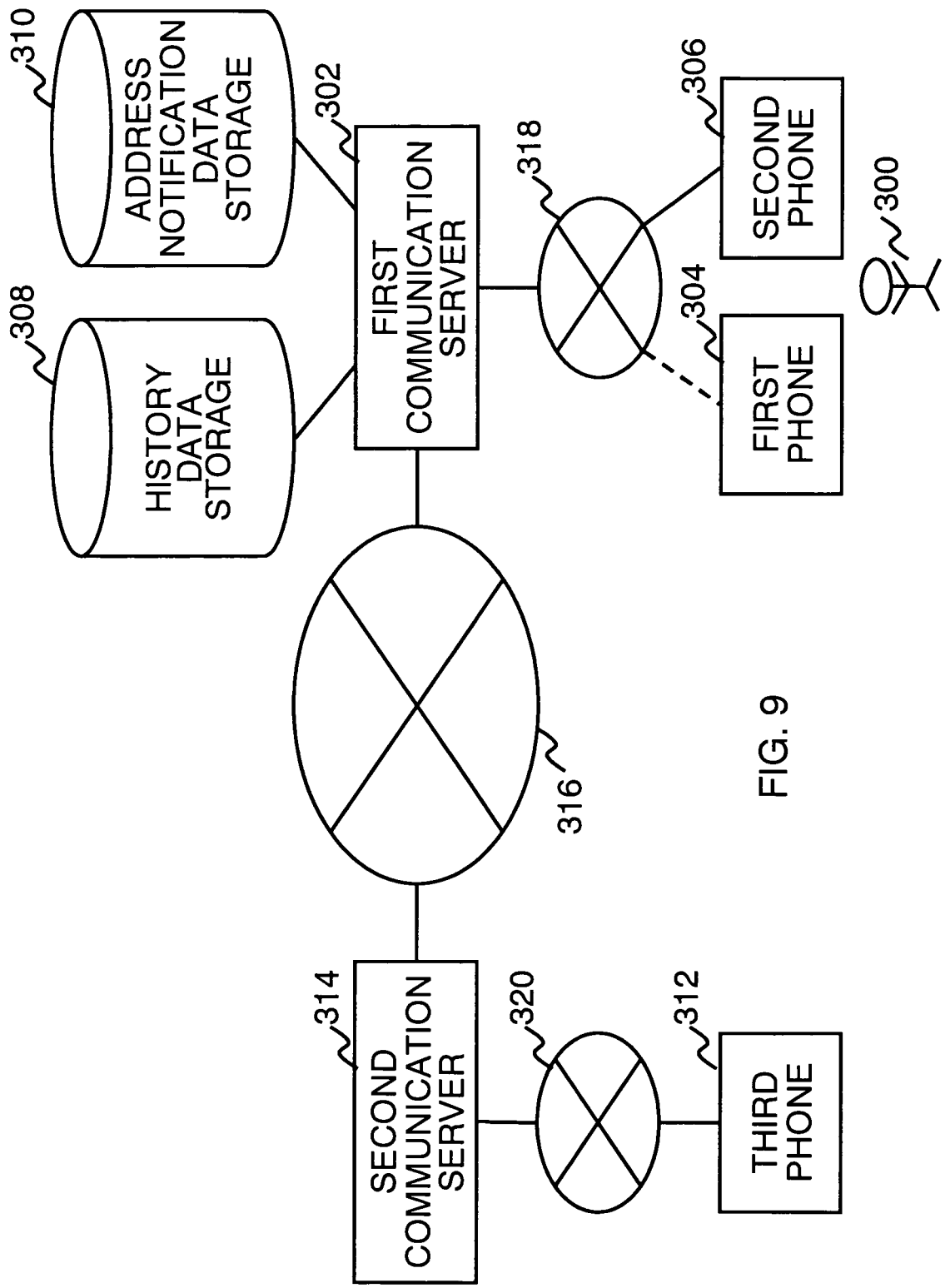
FIG. 9 is a diagram illustrating relations between phones and communication servers in a description of an identifier change notification method according to a second embodiment of the present invention.

Referring now to FIGS. 9 to 16, an identifier change notification method according to a second embodiment of the present invention will be described. The second embodiment of the present invention allows notification of the change of a phone mail address. FIG. 9 is a diagram illustrating relations between phones and communication servers in a description of an identifier change notification method according to a second embodiment of the present invention.

A phone mail address changer (the person who changes his or her phone mail address) 300 loses a first phone 304 controlled by a first communication server 302 and then uses a second phone 306 controlled by the same server. Accordingly, the phone mail address changer 300 is required to provide notification of a new phone mail address for identifying the second phone 306, to acquaintances who know only the previous phone mail address for identifying the first phone 304. The first communication server 302 stores history data relating to phones under its control in history data storage 308. The phone mail address changer 300 sets rules for determining whether to provide notification of the new phone mail address on the basis of the history data stored in the history data storage 308. These rules are contained in address notification data stored in address notification data storage 310 of the first communication server 302. The phones and communication servers shown in FIG. 9 may communicate with one another over communication networks 316, 318, and 320.

FIG. 10 is a diagram illustrating an example configuration of address notification data according to a second embodiment of the present invention. A customer ID 402 is data for uniquely identifying the phone mail address changer 300. A previous phone mail address 404 is a phone mail address of the phone mail address changer 300 before a phone mail address change is made, and serves as a destination address when receiving incoming phone mails from acquaintances of the phone mail address changer 300. A new phone mail address 406 is a phone mail address of the phone mail address changer 300 after the phone mail address change is made and serves as a main part of address notification data when a phone mail address change notification is provided. Notification adequacy determination rules 408 will be described later. A notification start date 410 is the start date of a phone mail address change notification service. A notification end date 412 is the end date of the phone mail address change notification service. The configuration of the address notification data stored in the address notification data storage 31Q is not limited to the configuration shown in FIG. 10 and may be any configuration as long as the address notification data stored in the address notification data storage 310 includes the previous phone mail address 404, new phone mail address 406, and notification adequacy determination rules 408.

FIG. 11 is a diagram illustrating examples of notification adequacy determination rules according to a second embodiment of the present invention. Each rule record contains a rule ID 452 identifiable of the rule, a notification adequacy 454 indicating a determination result, and conditions for determination. In this example, adequacy of notification is determined on the basis of an incoming phone mail count 458, an outgoing phone mail count 460, or an average received data amount 462 during a target period 456 contained in the history data stored in the history data storage 308. Any blank item in FIG. 11 indicates that no condition is set for the blank item. A rule_21 indicates that the new phone mail address 406 will not be provided to a target to which no phone mail has been sent during the last 30 days according to the history data stored in the history data storage 308. A rule_22 indicates that the new phone mail address 406 will not be provided to a target from which no phone mail has been received during the last 10 days according to the history data stored in the history data storage 308. A rule_23 indicates that the new phone mail address 406 will not be provided to a target from which more than ten phone mails have been received and an average data amount of the received incoming phone mails exceeds 1000 kB through the entire period of time according to the history data stored in the history data storage 308. The phone mail address changer 300 defines rules in such manners. Accordingly, notification of the new phone mail address 406 is provided to targets that do not satisfy the conditions set under these rules. The rules shown in FIG. 11 are applicable as long as the history data stored in the history data storage 308 includes, for example, data on the date and time of receiving phone mails, the date and time of sending phone mails, and the amount of received data. The notification adequacy determination rules 408 are not limited to what are shown in FIG. 11 and any arbitrary rule may be set on the basis of data on the count or frequency of incoming/outgoing phone mails, an amount of sent/received data, an hour of day of incoming/outgoing phone mails, a character string included in an incoming phone mail, an operation for refusing phone mail reception, or the like obtained from the history data stored in the history data storage 308. In addition to rules based on data on the history data stored in the history data storage 308, rules based on data on the currently received incoming phone mail may be set. Such rules may include a rule based on the time of phone mail reception, a source address registered to a phone mail reception refusal list, or the like.

FIG. 12 is a diagram illustrating an example configuration of history data according to a second embodiment of the present invention. A customer phone mail address 414 is a phone mail address controlled by the first communication server 302. For the sake of convenience, it is assumed that the history data storage 308 stores history data relating to the previous phone mail address of only a customer requesting the phone mail address change notification service. A counterpart phone mail address 416 is a phone mail address of a counterpart which the customer identified with the customer phone mail address 414 has sent or received a phone mail to or from. An incoming date & time 418 is data indicating the date and time of when the phone mail has been received. An outgoing date & time 420 is data indicating the date and time of when the phone mail has been sent. A received data amount 422 is the amount of data contained in a received incoming phone mail. A sent data amount 424 is the amount of data contained in a sent phone mail. The configuration of the history data stored in the history data storage 308 is not limited to the configuration shown in FIG. 12 and may be any configuration as long as the history data includes the customer phone mail address 414 and counterpart phone mail address 416. The notification adequacy determination rules 408 are configured on the basis of data included in the history data stored in the history data storage 308.

Figure 13:
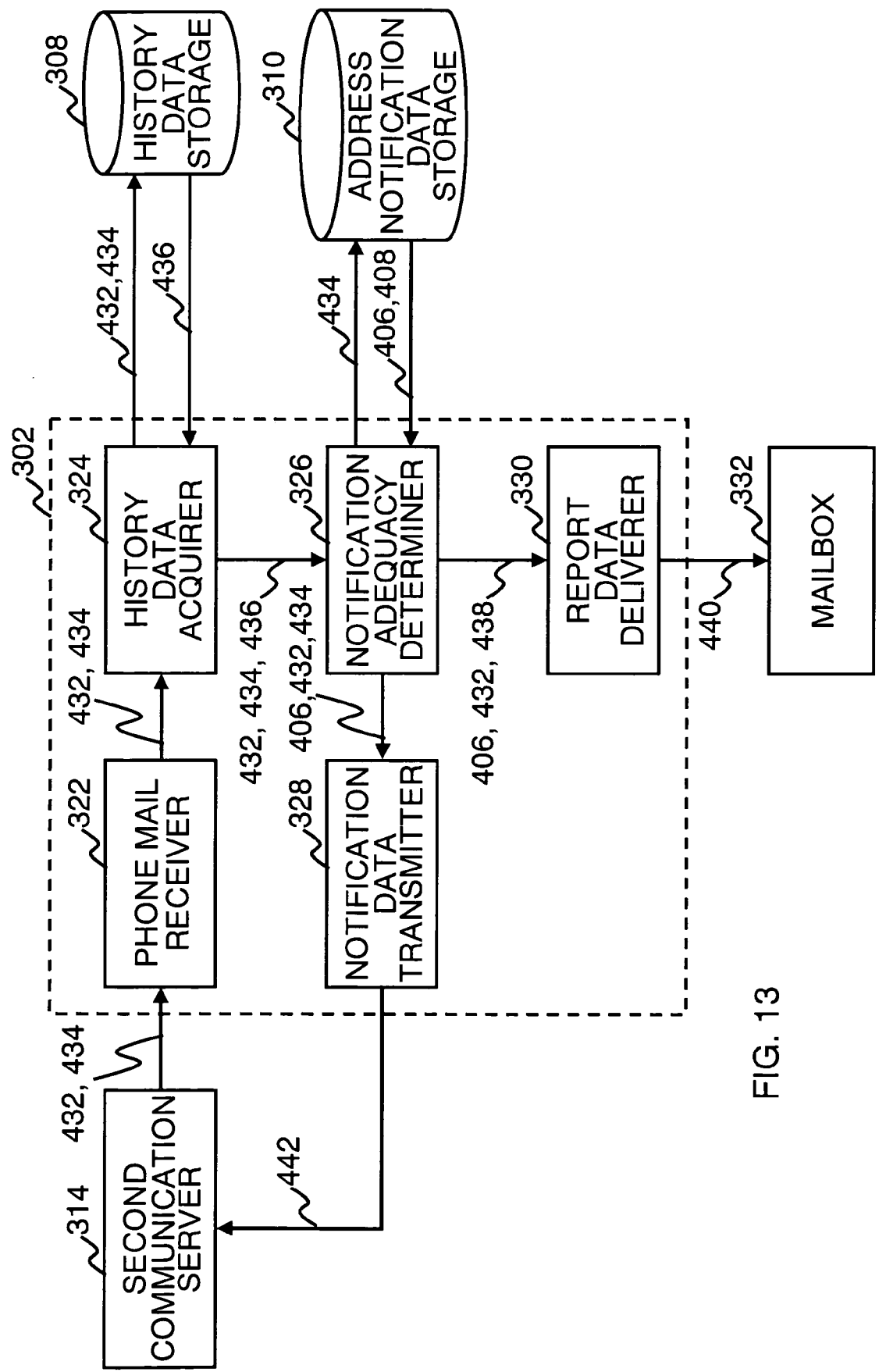
FIG. 13 is a block diagram illustrating an outline configuration of a first communication server executing an identifier change notification method according to a second embodiment of the present invention.
Figure 14:
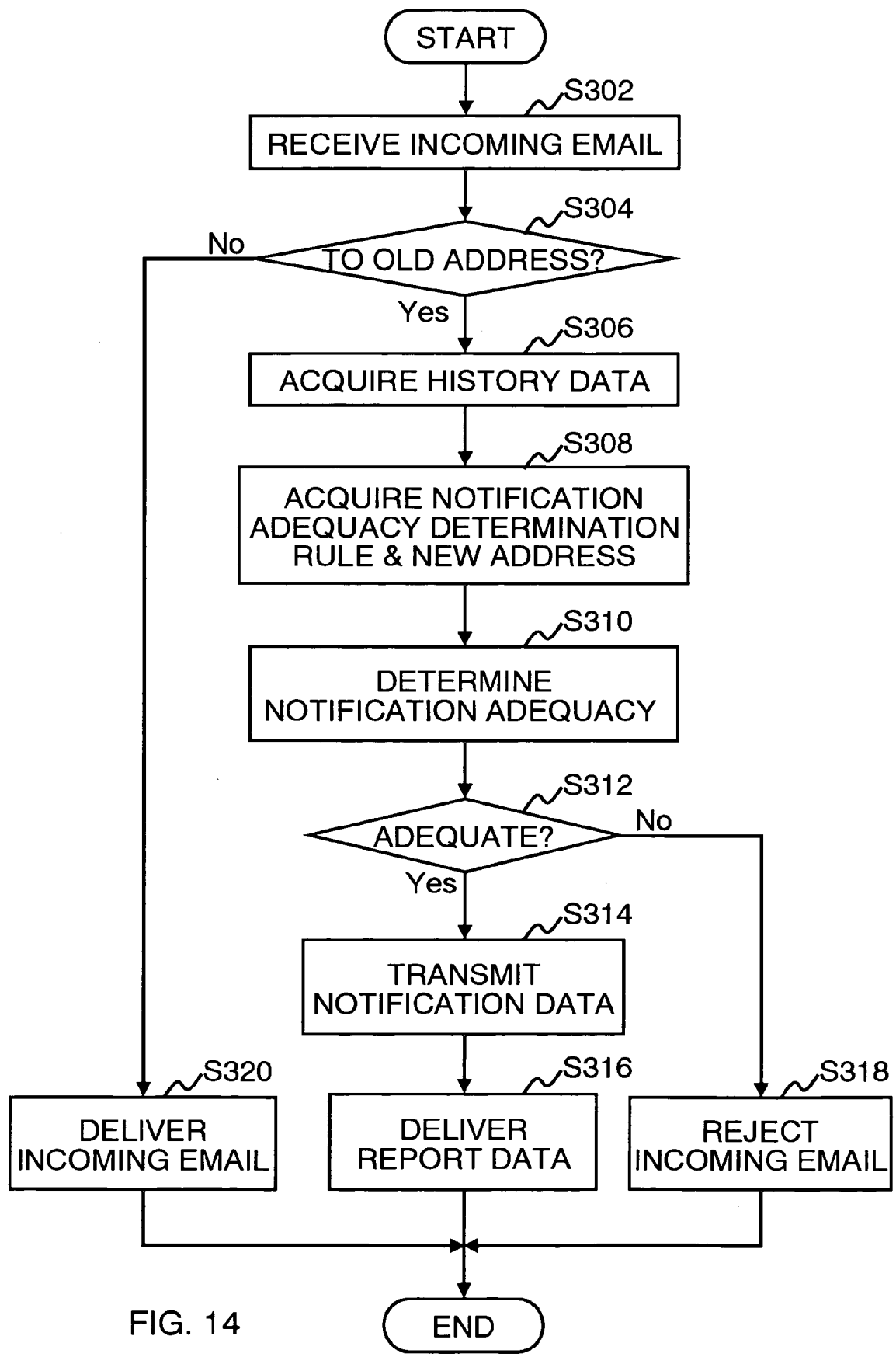
FIG. 14 is a flowchart illustrating a processing flow of a first communication server executing an identifier change notification method according to a second embodiment of the present invention.

FIG. 13 is a block diagram illustrating an outline configuration of a first communication server executing an identifier change notification method according to a second embodiment of the present invention. FIG. 14 is a flowchart illustrating a processing flow of a first communication server executing an identifier change notification method according to a second embodiment of the present invention.

When an acquaintance of the phone mail address changer 300 sends a phone mail to the previous phone mail address 404 of the phone mail address changer 300 from a third phone 312, the phone mail is received by the first communication server 302 via a second communication server 314.

A phone mail receiver 322 acquires a source address 432 and destination address 434 (operation S302) and outputs the acquired addresses to a history data acquirer 324.

The history data acquirer 324 searches the history data storage 308 for history data 436 including the destination address 434 as the customer phone mail address 414 and the source address 432 as the counterpart phone mail address 416 (operation S306) and then outputs the acquired history data 436 as well as the source address 432 and destination address 434 to a notification adequacy determiner 326. If there is no history data including the destination address 434 as the customer phone mail address 414, a normal phone mail delivery process is performed (operation S320). This process will not be described.

The notification adequacy determiner 326 searches the address notification data storage 310 for address notification data including the destination address 434 as the previous phone mail address 404 to acquire the notification adequacy determination rules 408 and the new phone mail address 406 (operation S308). The notification adequacy determiner 326 analyses the history data 436 in accordance with the notification adequacy determination rules 408 so as to determine adequacy of notification of the phone mail address change (operation S310). Then the notification adequacy determiner 326 outputs a determination result 438 as well as the source address 432 and new phone mail address 406 to a report data deliverer 330. If the determination result 438 indicates that notification is adequate (Yes in operation S312), the notification adequacy determiner 326 outputs the source address 432, destination address 434, and new phone mail address 406 to a notification data transmitter 328. If the determination result 438 indicates that notification is inadequate (No in operation S312), a normal delivery refusal process (operation S318) is performed. The normal delivery refusal process is the same process usually performed when the destination address 434 is invalid, thus the process will not be described.

The notification data transmitter 328 incorporates the destination address 434 and new phone mail address 406 into a previously prepared notification message and then transmits the resultant message 442 as a replying phone mail to the source address 423 (operation S314). A new phone number as well as the new phone mail address 406 may be incorporated into the notification message. Thus, the phone mail source may be also notified that a phone number has been changed. Also, the incoming phone mail may be delivered to a mailbox 332 for the new phone mail address 406 while transmitting the notification message as a phone mail.

The report data deliverer 330 selects a report message in accordance with the determination result 438 from among report messages previously prepared for each determination result, incorporates the source address 432 into the selected report message, and delivers the resultant message 440 to the mailbox 332 for the new phone mail address 406. The processing result of the notification data transmission may be notified to the report data deliverer 330 by the notification data transmitter 328, and a report message reflecting the processing result may be delivered.

Figure 15:
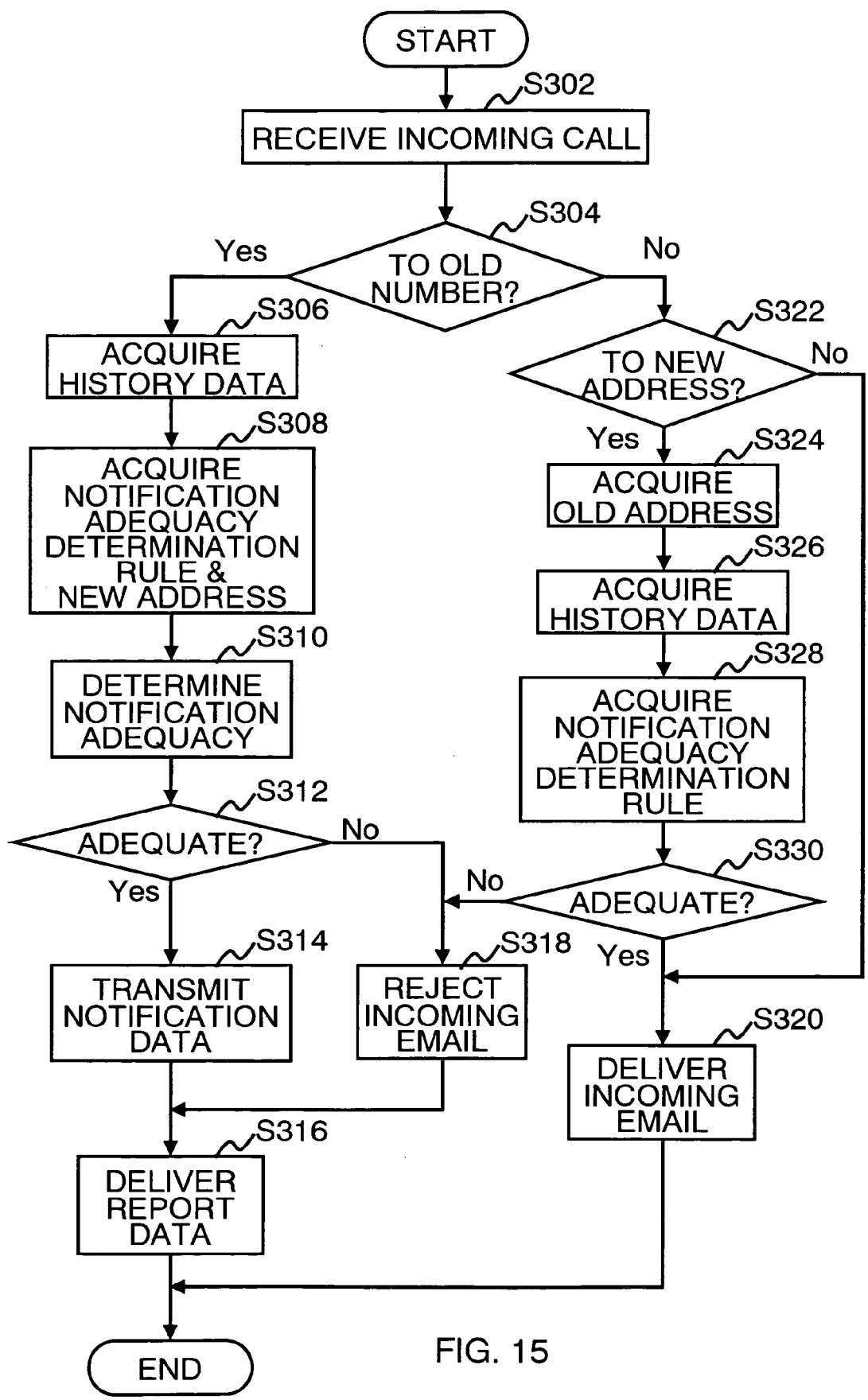
FIG. 15 is a flowchart illustrating a processing flow of a first communication server according to a second embodiment of the present invention when receiving a phone mail to a new phone mail address.

A phone mail to the new phone mail address 406 may be refused to deliver if the source address 432 is determined, by the notification adequacy determiner 326, f to be inadequate to be notified of the phone mail address change. FIG. 15 is a flowchart illustrating a processing flow of a first communication server according to a second embodiment of the present invention when receiving an incoming phone mail to a new phone mail address. If the history data storage 308 stores no history data including the destination address 434 as the customer phone mail address 414 (No in operation S304), the history data acquirer 324 searches the address notification data storage 310 for address notification data including the destination address 434 as the new phone mail address 406 to acquire the previous phone mail address 404 (operation S324). The history data acquirer 324 searches the history data storage 308 for the history data 436 including the previous phone mail address 404 as the customer phone mail address 414 and the source address 432 as the counterpart phone mail address 416 (operation S326) and then outputs the acquired history data 436 as well as the source address 432 and destination address 434 to the notification adequacy determiner 326.

The notification adequacy determiner 326 searches the address notification data storage 310 for address notification data including the destination address 434 as the new phone mail address 406 to acquire the notification adequacy determination rules 408 (operation S328). The notification adequacy determiner 326 analyses the history data 436 in accordance with the notification adequacy determination rules 408 to determine adequacy of the delivery. If it is determined that notification is adequate, in accordance with the notification adequacy determination rules 408, the delivery may be adequate. If it is determined that notification is inadequate, the delivery is inadequate. If the delivery is adequate (Yes in operation S330), a normal delivery process is performed (operation S320). If the delivery is inadequate (No in operation S330), a normal delivery refusal process is performed (operation S318) and the notification adequacy determiner 326 outputs the determination result 438 as well as the source address 432 and destination address 434 to the report data deliverer 330. The report data deliverer 330 incorporates the source address 432 into a previously prepared report message and then delivers the resultant message 440 to the mailbox 332 for the destination address 434 (operation S316). Or the report data deliverer 330 may deliver the incoming phone mail regardless of whether the delivery is adequate or not and then, if the delivery is inadequate, the report data deliverer 330 may send a phone mail on normal delivery refusal to the source address 432 and deliver a transmittal report of the phone mail on delivery refusal to the mailbox 332 for the destination address 434.

Figure 16:
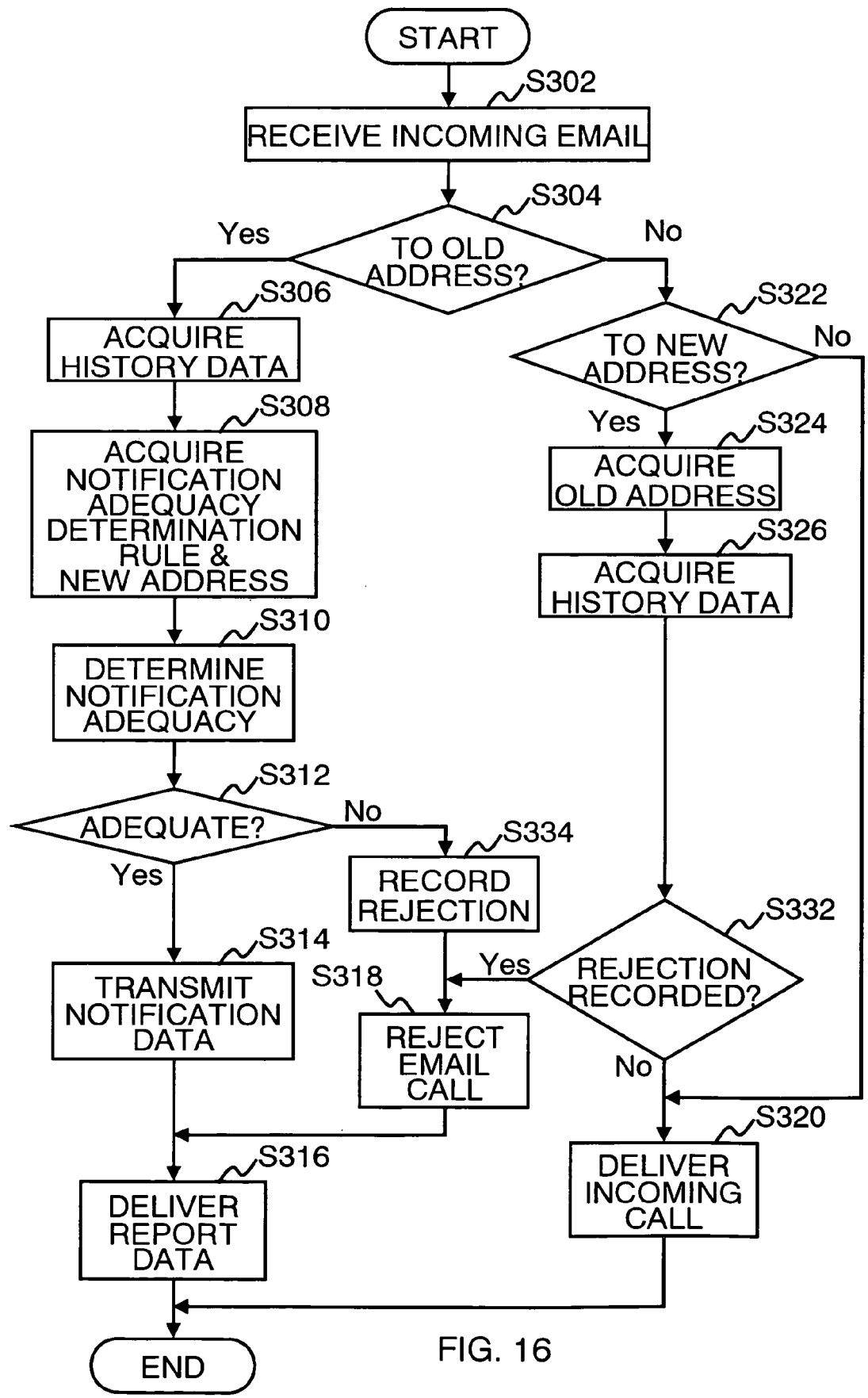
FIG. 16 is a flowchart illustrating a processing flow of a first communication server according to a second embodiment of the present invention when receiving an incoming phone mail to a new phone mail address.
Figure 17:
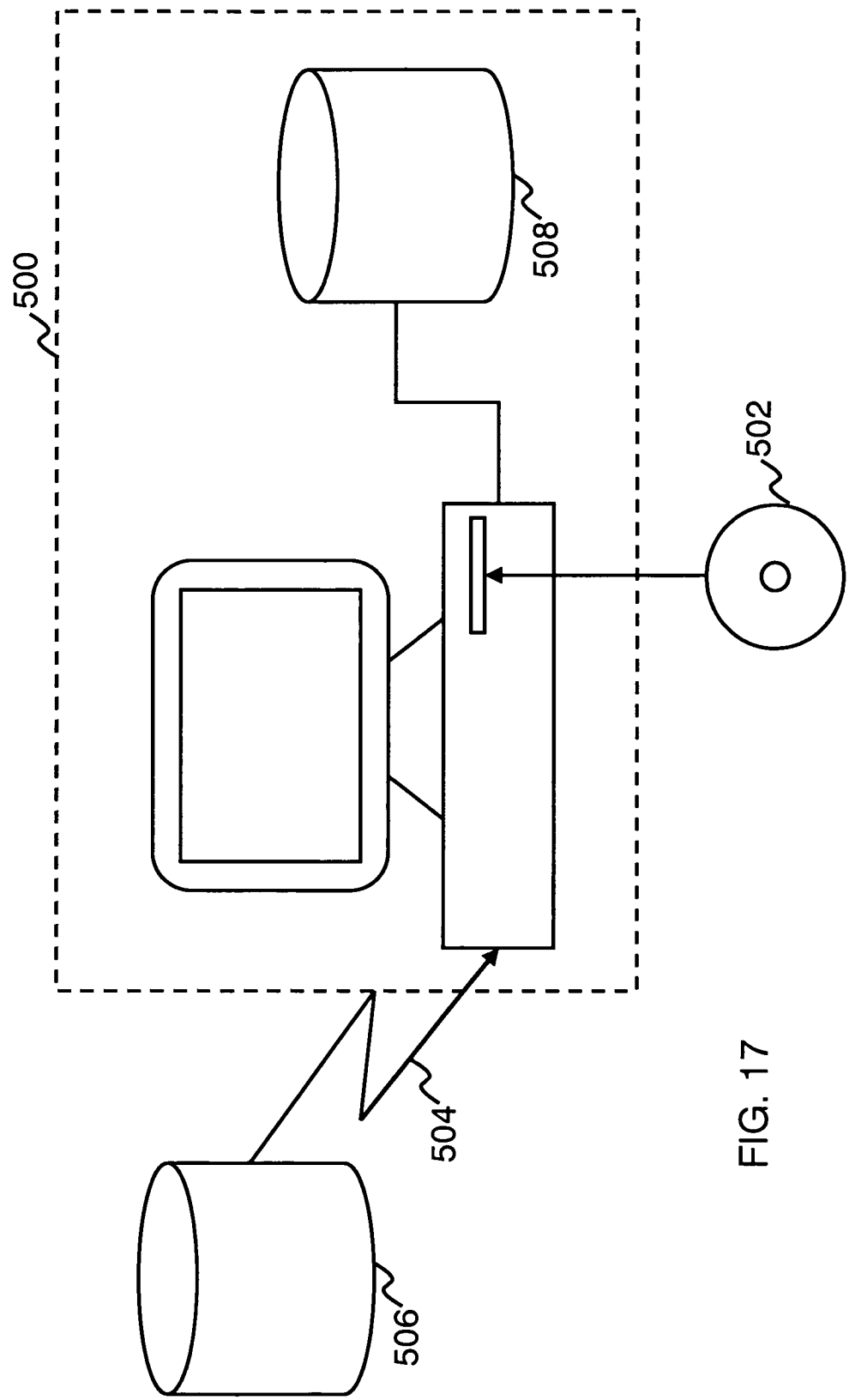
FIG. 17 is a diagram illustrating an example of a computer environment.

An incoming phone mail to the new phone mail address 406 may be refused to deliver if a phone mail has been sent from the source address 432 to the previous phone mail address 404 and no phone mail address change notification has been provided thereto. FIG. 16 is a flowchart illustrating a processing flow of a first communication server according to a second embodiment of the present invention when receiving an incoming phone mail to a new phone mail address. If it is determined that notification is inadequate for an incoming phone mail to the previous phone mail address 404 (No in operation S312), the history data acquirer 324 adds data indicating that notification is inadequate, to the history data 436 including the destination address 434 as the customer phone mail address 414 and the source address 432 as the counterpart phone mail address 416 (operation S334). If the incoming phone mail is not destined for the previous phone mail address 404, that is, if the history data storage 308 stores no history data including the destination address 434 as the customer phone mail address 414 (No in operation S304), the history data acquirer 324 searches the address notification data storage 310 for address notification data including the destination address 434 as the new phone mail address 406 to acquire the previous phone mail address 404 (operation S324). The history data acquirer 324 searches the history data storage 308 for the history data 436 including the previous phone mail address 404 as the customer phone mail address 414 and the source address 432 as the counterpart phone mail address 416 (operation S326). If the acquired history data 436 contains data indicating that notification is inadequate (Yes in operation S332), a normal delivery refusal process is performed (operation S318), and the history data acquirer 324 outputs the source address 432 and destination address 434 to the report data deliverer 330. The report data deliverer 330 incorporates the source address 432 into a previously prepared report message and then delivers the resultant message 440 to the mailbox 332 for the destination address 434. Alternatively, the report data deliverer 330 may deliver the incoming phone mail, send a phone mail on normal delivery refusal to the source address 432, and deliver a transmittal report of the phone mail on delivery refusal to the mailbox 332 for the destination address 434.

Although the phone mail address change notification is provided by the first communication server 302 in the above description, it may be provided by the second phone 306 instead. Such an arrangement is, for example, storing history data related to the previous phone mail address in a storage of the second phone 306 instead of the history data storage 308, delivering an incoming phone mail destined for the previous phone mail address to the mailbox 332 for the new phone mail address with a memo reporting that the incoming phone mail is destined to the previous phone mail address. In this case, delivery of report message 440 (operation S316) may not be required.

The identifier change notification apparatus according to the above-described embodiments may be performed not only using hardware but also using software of a computer. For example, in the first embodiment, by creating a program for causing a computer to perform the functions of the call receiver 122, history data acquirer 124, notification adequacy determiner 126, notification data transmitter 128, and report data transmitter 130 shown in FIG. 5 and by causing a memory of a computer to read and execute the program, the first communication server 102 shown in FIG. 5 is achieved. The second embodiment may also be achieved using software (program) of a computer.

Programs for achieving the identifier change notification methods according to the embodiments of the present invention may be stored in any of a transportable recording medium 502 such as a CD-ROM, a CD-RW, a DVD-R, a DVD-RAM, a DVD-RW, and a flexible disk, another storage unit 506 provided on a communication line 504, and a storage unit or recording medium 508 of a computer system 500, such as a hard disk or a RAM. The program is loaded into a main memory and executed therein.

What is claimed is:

1. An identifier change notification method to notify a communication device of a change of a communication identifier, the method executed by an information processing apparatus capable of communicating with the communication device, the information processing apparatus including a data storage, the data storage storing a previous identifier and a new identifier in association with each other and history data relating to the previous identifier, the method comprising:

receiving incoming data transmitted from the communication device;

acquiring, from the incoming data, both a source identifier capable of identifying a source of the incoming data and a destination identifier capable of identifying a destination of the incoming data;

acquiring, from the data storage, history data relating to both the previous identifier and the source identifier when the destination identifier matches the previous identifier;

determining, on a basis of evaluating the incoming data and the history data, adequacy of notifying the communication device of the new identifier; and transmitting notification data including the new identifier to the communication device based on the determining, and wherein the determining applies a rule set to analyze previous communications related to the source identifier and the previous identifier based on the history data.

2. The identifier change notification method of claim 1, wherein said information processing apparatus is a communication server.

3. The identifier change notification method of claim 1, wherein said communication identifier is a phone number.

4. The identifier change notification method of claim 1, wherein said communication identifier is a phone mail address.

5. The identifier change notification method of claim 1, comprising:

acquiring the previous identifier stored in the data storage in association with the new identifier if the destination identifier matches the new identifier;

acquiring, from the data storage, history data relating to both the previous identifier and the source identifier when the destination identifier matches the new identifier; and refusing transfer of the incoming data if the determined adequacy indicates that a notification is inadequate.

6. The identifier change notification method of claim 1, comprising:

acquiring the previous identifier stored in the data storage in association with the new identifier when the destination identifier matches the new identifier;

refusing transfer of the incoming data when the data storage has refusal data indicating that a notification is inadequate with respect to the source identifier; and storing the refusal data in the data storage when the determined adequacy indicates that the notification is inadequate.

7. The identifier change notification method of claim 1, wherein the determining evaluates the incoming data and the history data using a rule set.

8. A non-transitory computer readable storage medium storing a program of instructions for an information processing apparatus to execute an identifier change notification method to notify a communication device of a change of a communication identifier, the information processing apparatus capable of communicating with the communication device and including a data storage, the data storage storing a previous identifier and a new identifier in association with each other and history data relating to the previous identifier, the method comprising:

receiving, incoming data transmitted from the communication device;

acquiring, from the incoming data, both a source identifier capable of identifying a source of the incoming data and a destination identifier capable of identifying a destination of the incoming data;

acquiring, from the data storage, history data relating to both the previous identifier and the source identifier when the destination identifier matches the previous identifier;

determining, on a basis of evaluating the incoming data and the history data, adequacy of notifying the communication device of the new identifier; and transmitting notification data including the new identifier to the communication device based on the determining, and wherein the determining applies a rule set to analyze previous communications related to the source identifier and the previous identifier based on the history data.

9. The computer readable storage medium of claim 8, wherein the device serves as a communication server.

10. The computer readable storage medium of claim 8, wherein said communication identifier is a phone number.

11. The computer readable storage medium of claim 8, wherein said communication identifier is a phone mail address.

12. The computer readable storage medium of claim 8, the method comprising:

acquiring the previous identifier stored in the data storage in association with the new identifier when the destination identifier matches the new identifier;

acquiring, from the data storage, history data relating to both the previous identifier and the source identifier when the destination identifier matches the new identifier; and refusing transfer of the incoming data when the determined adequacy indicates that a notification is inadequate.

13. The computer readable storage medium of claim 8, the method comprising:

acquiring the previous identifier stored in the data storage in association with the new identifier when the destination identifier matches the new identifier;

refusing transfer of the incoming data when the data storage has refusal data indicating that a notification is inadequate with respect to the source identifier; and storing the refusal data in the data storage when the determined adequacy indicates that the notification is inadequate.

14. The computer readable storage medium of claim 8, wherein the notification adequacy determiner evaluates the incoming data and the history data using a rule set.

15. An identifier change notification apparatus notifying a communication device of a change of a communication identifier, comprising:

a data storage to store a previous identifier and a new identifier in association with each other and history data relating to the previous identifier;

an incoming data receiver to receive incoming data transmitted from the communication device, and acquiring, from the incoming data, both a source identifier capable of identifying a source of the incoming data and a destination identifier capable of identifying a destination of the incoming data;

a history data acquirer to acquire, from the data storage, history data relating to both the previous identifier and the source identifier when the destination identifier matches the previous identifier;

a notification adequacy determiner to determine, on a basis of evaluating the incoming data and the history data, adequacy of notifying the communication device of the new identifier; and a notification data transmitter to transmit notification data including the new identifier to the communication device based on the determining, and wherein the determining applies a rule set to analyze previous communications related to the source identifier and the previous identifier based on the history data.

16. The identifier change notification apparatus of claim 15, wherein said information processing apparatus is a communication server.

17. The identifier change notification apparatus of claim 15, wherein said communication identifier is a phone number.

18. The identifier change notification apparatus of claim 15, wherein said communication identifier is a phone mail address.

19. The identifier change notification apparatus of claim 15, wherein said notification adequacy determiner acquires the previous identifier stored in the data storage in association with the new identifier when the destination identifier matches the new identifier, said history data acquirer acquires, from the data storage, history data relating to both the previous identifier and the source identifier when the destination identifier matches the new identifier, and said notification data transmitter refuses transfer of the incoming data when the determined adequacy indicates that a notification is inadequate.

20. The identifier change notification apparatus of claim 15, wherein said notification adequacy determiner acquires the previous identifier stored in the data storage in association with the new identifier when the destination identifier matches the new identifier, said notification data transmitter refuses transfer of the incoming data when the data storage has refusal data indicating that a notification is inadequate with respect to the source identifier, and said notification adequacy determiner stores the refusal data in the data storage when the determined adequacy indicates that the notification is inadequate.

* * * * *

UNITED STATES PATENT AND TRADEMARK OFFICE
CERTIFICATE OF CORRECTION

PATENT NO. : 8,582,744 B2  
APPLICATION NO. : 12/222378  
DATED : November 12, 2013  
INVENTOR(S) : Takashi Ikemori et al.

Page 1 of 1

It is certified that error appears in the above-identified patent and that said Letters Patent is hereby corrected as shown below:

On the Title Page, Item 63 (Related U.S. Application Data), Line 1, Delete "PCT/JP2008/303714," and insert -- PCT/JP2006/303714, --, therefor.

Signed and Sealed this
Eighteenth Day of February, 2014

Michelle K. Lee
*Deputy Director of the United States Patent and Trademark Office*